United States Patent
Russell

(10) Patent No.: US 11,661,921 B2
(45) Date of Patent: May 30, 2023

(54) WIND, WAVE, AND WATER POWER GENERATION SYSTEM

(71) Applicant: ForceGenie, LLC, Richardson, TX (US)

(72) Inventor: Bradford O. Russell, Garland, TX (US)

(73) Assignee: ForceGenie, LLC, Richardson, TX (US)

( * ) Notice: Subject to any disclaimer, the term of this patent is extended or adjusted under 35 U.S.C. 154(b) by 0 days.

(21) Appl. No.: 17/451,364

(22) Filed: Oct. 19, 2021

(65) Prior Publication Data

US 2022/0120258 A1 Apr. 21, 2022

Related U.S. Application Data

(60) Provisional application No. 63/094,249, filed on Oct. 20, 2020.

(51) Int. Cl.
| | | |
|---|---|---|
| *F03D 9/00* | (2016.01) | |
| *F03B 13/00* | (2006.01) | |
| *F03B 3/12* | (2006.01) | |
| *F03D 13/25* | (2016.01) | |

(52) U.S. Cl.
CPC .............. *F03D 9/008* (2013.01); *F03B 3/121* (2013.01); *F03B 13/00* (2013.01); *F03D 13/25* (2016.05); *F05B 2220/705* (2020.08); *F05B 2240/93* (2013.01)

(58) Field of Classification Search
CPC .......... F03D 9/008; F03D 13/25; F03B 3/121; F03B 13/00; F05B 2220/705; F05B 2240/93
See application file for complete search history.

(56) References Cited

U.S. PATENT DOCUMENTS

| | | |
|---|---|---|
| 1,887,316 A | 11/1932 | Lockfaw |
| 4,686,376 A | 8/1987 | Retz |
| 5,440,176 A * | 8/1995 | Haining .................. F03B 13/10 290/43 |
| 6,100,600 A | 8/2000 | Pflanz |
| 7,821,150 B2 | 10/2010 | Wolfe |
| 8,143,736 B2 | 3/2012 | Farb |
| 8,878,381 B2 | 11/2014 | Henry |
| 9,739,257 B2 | 8/2017 | Bateman |
| 10,422,311 B2 | 9/2019 | Gehring |
| 2004/0007881 A1 | 1/2004 | Kobashikawa et al. |
| 2005/0012338 A1 | 1/2005 | Chang |

(Continued)

FOREIGN PATENT DOCUMENTS

| | | | | |
|---|---|---|---|---|
| EP | 2636892 A2 * | 9/2013 | ............ | F03D 3/002 |
| WO | WO-2008085056 A1 * | 7/2008 | ............ | F03B 17/062 |

*Primary Examiner* — Viet P Nguyen

(57) ABSTRACT

A power generation system includes a flotation assembly configured to float in water and a first harnessing assembly coupled to the flotation assembly and disposed in an airflow above the water. The first harnessing assembly is configured to harness the airflow to create a first rotational energy. The system also includes a second harnessing assembly coupled to the flotation assembly and disposed in the water. The second rotational assembly is configured to harness movement of the water to create a second rotational energy. The flotation assembly also includes a generating module to convert the first and second rotational energies into electrical energy.

15 Claims, 4 Drawing Sheets

(56) References Cited

U.S. PATENT DOCUMENTS

| | | |
|---|---|---|
| 2006/0202483 A1 | 9/2006 | Gonzalez |
| 2007/0081861 A1 | 4/2007 | Goble |
| 2008/0309089 A1 | 12/2008 | Lin |
| 2009/0015015 A1* | 1/2009 | Joutsiniemi ............... F03D 3/02 |
| | | 290/52 |
| 2009/0127860 A1 | 5/2009 | Brown |
| 2009/0189395 A1 | 7/2009 | Ryynanen et al. |
| 2009/0236855 A1 | 9/2009 | Jordan |
| 2009/0322091 A1 | 12/2009 | Jack |
| 2010/0013228 A1 | 1/2010 | Duggleby et al. |
| 2010/0013229 A1 | 1/2010 | Da Costa |
| 2010/0095609 A1 | 4/2010 | Kim |
| 2010/0219645 A1* | 9/2010 | Yamamoto ............... B63B 35/44 |
| | | 416/85 |
| 2010/0237625 A1 | 9/2010 | Dempster |
| 2011/0140454 A1 | 6/2011 | Earl |
| 2012/0019003 A1 | 1/2012 | Hu |
| 2012/0086207 A1 | 4/2012 | Gray |
| 2012/0086208 A1 | 4/2012 | Gray |
| 2017/0194837 A1* | 7/2017 | Sichau ................. H02K 7/1876 |
| 2019/0186457 A1 | 6/2019 | Carruthers |
| 2020/0191120 A1 | 6/2020 | Han |

* cited by examiner

WIND, WAVE, AND WATER POWER GENERATION SYSTEM

BACKGROUND

Energy dependence for oil, coal, and gas is tremendous and yet these sources of energy are depleting sources of energy. Further, electricity produced using these resources cause pollution. Thus, renewable sources of energy are advantageous for a number of reasons.

BRIEF SUMMARY

According to one aspect of the present disclosure, a power generation system includes a flotation assembly configured to float in water and a first harnessing assembly coupled to the flotation assembly and disposed in an airflow above the water. The first harnessing assembly is configured to harness the airflow to create a first rotational energy. The system also includes a second harnessing assembly coupled to the flotation assembly and disposed in the water. The second rotational assembly is configured to harness movement of the water to create a second rotational energy. The flotation assembly also includes a generating module to convert the first and second rotational energies into electrical energy.

According to another aspect of the present disclosure, a power generation system includes a flotation assembly configured to float in water and a first harnessing assembly extending from the flotation assembly into an airflow above the water. The first harnessing assembly harnesses the airflow to generate a first kinetic energy and is configured to orient itself corresponding to a direction of the airflow. The system also includes a second harnessing assembly extending from the flotation assembly into the water that harnesses movement of the water to generate a second kinetic energy. The second harnessing assembly is coupled to the flotation assembly to self-orient corresponding to a direction of the movement of the water. The flotation assembly also includes a generating module to convert the first and second kinetic energies into electrical energy.

According to yet another aspect of the present disclosure, a power generation system includes a flotation assembly configured to float in water and a first harnessing assembly extending from the flotation assembly into an airflow above the water. The first harnessing assembly has a first helical paddle to harness the airflow to generate a first rotational energy. The system also includes a second harnessing assembly extending from the flotation assembly into the water and having a second helical paddle to harness movement of the water to generate a second rotational energy. The flotation assembly also includes a generating module to convert the first and second rotational energies into electrical energy.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a power generation system includes a flotation assembly configured to float in water and a first harnessing assembly coupled to the flotation assembly and disposed in an airflow above the water. The first harnessing assembly is configured to harness the airflow to create a first rotational energy. The system also includes a second harnessing assembly coupled to the flotation assembly and disposed in the water. The second rotational assembly is configured to harness movement of the water to create a second rotational energy. The flotation assembly also includes a generating module to convert the first and second rotational energies into electrical energy. According to one embodiment, the power generation system according to the present disclosure converts mechanical energy into electricity from the horizontal input energy of the wind and water, and the vertical, rise and fall, input energy of wave action. In some embodiments, the system includes helical shaped paddles such that wind and water currents that are forced into a sweeping blade (paddle) and, by the swirling cup affect, causes the blade to rotate in a single continuous direction. Thus, in some embodiments, the helix shape of the paddles or blades of the system captures input from any direction and creates a rotation in a specific direction even with oscillating input. Winds, water density, and tides all drive ocean currents. Coastal and sea floor features influence their location, direction, and speed. Earth's rotation results in the Coriolis effect which also influences ocean currents. Embodiments of the present disclosure use rotating paddles, both above and below the water surface, which are designed to maximize the energy input into the system while minimizing any drag or noncommon input. The blades rotate the same direction from wind and/or water action (movement) of any direction. The system will use wind movement (horizontal), wave action (vertical), and water movement (horizontal), to create electrical power from the transformation of motion energy into electrical energy. This is achieved through an electrical generator for converting mechanical energy into electrical energy.

Figure 1:
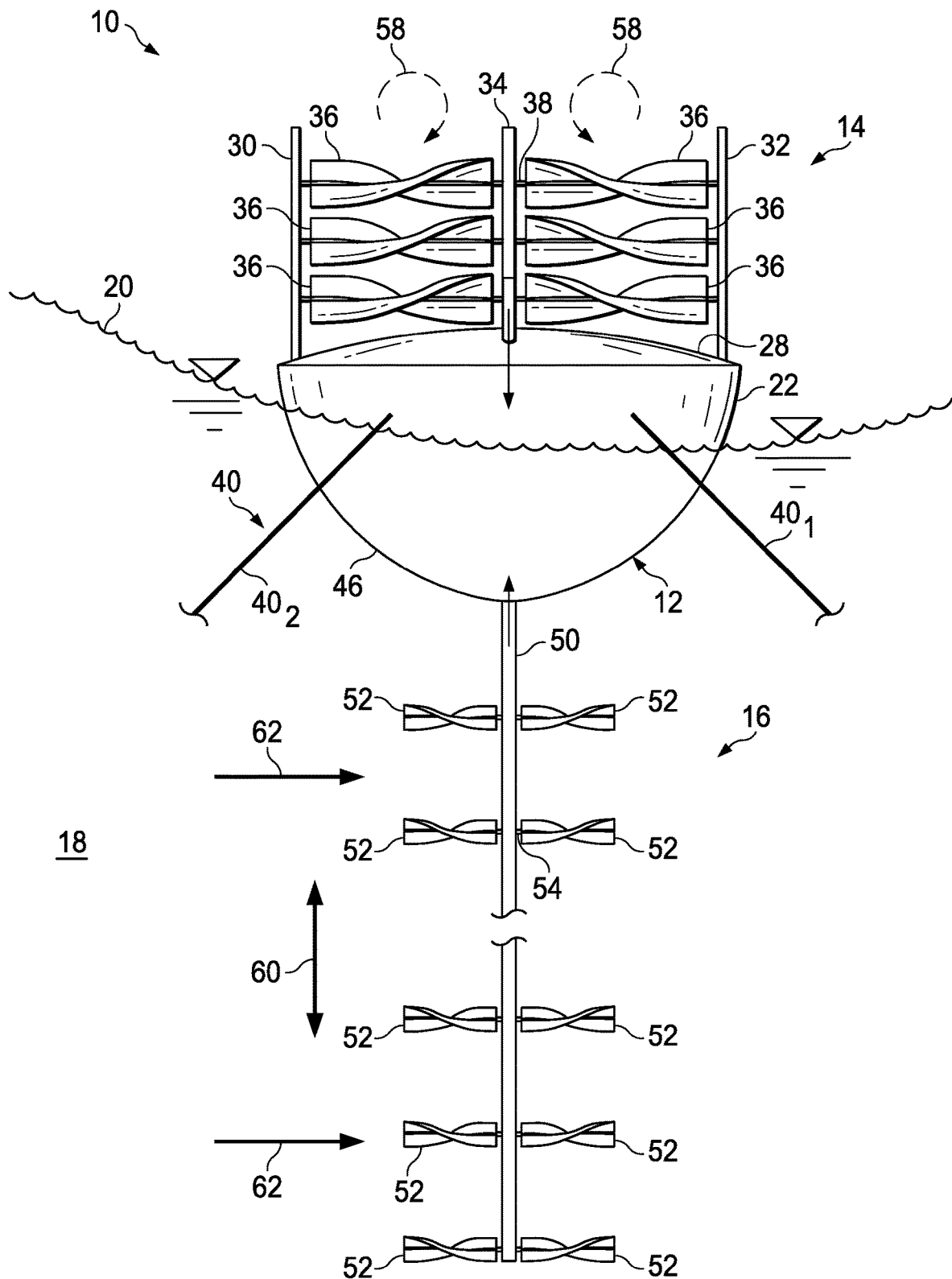
FIG. 1 is a diagram illustrating a front view of an embodiment of a power generation system according to the present disclosure.
Figure 2:
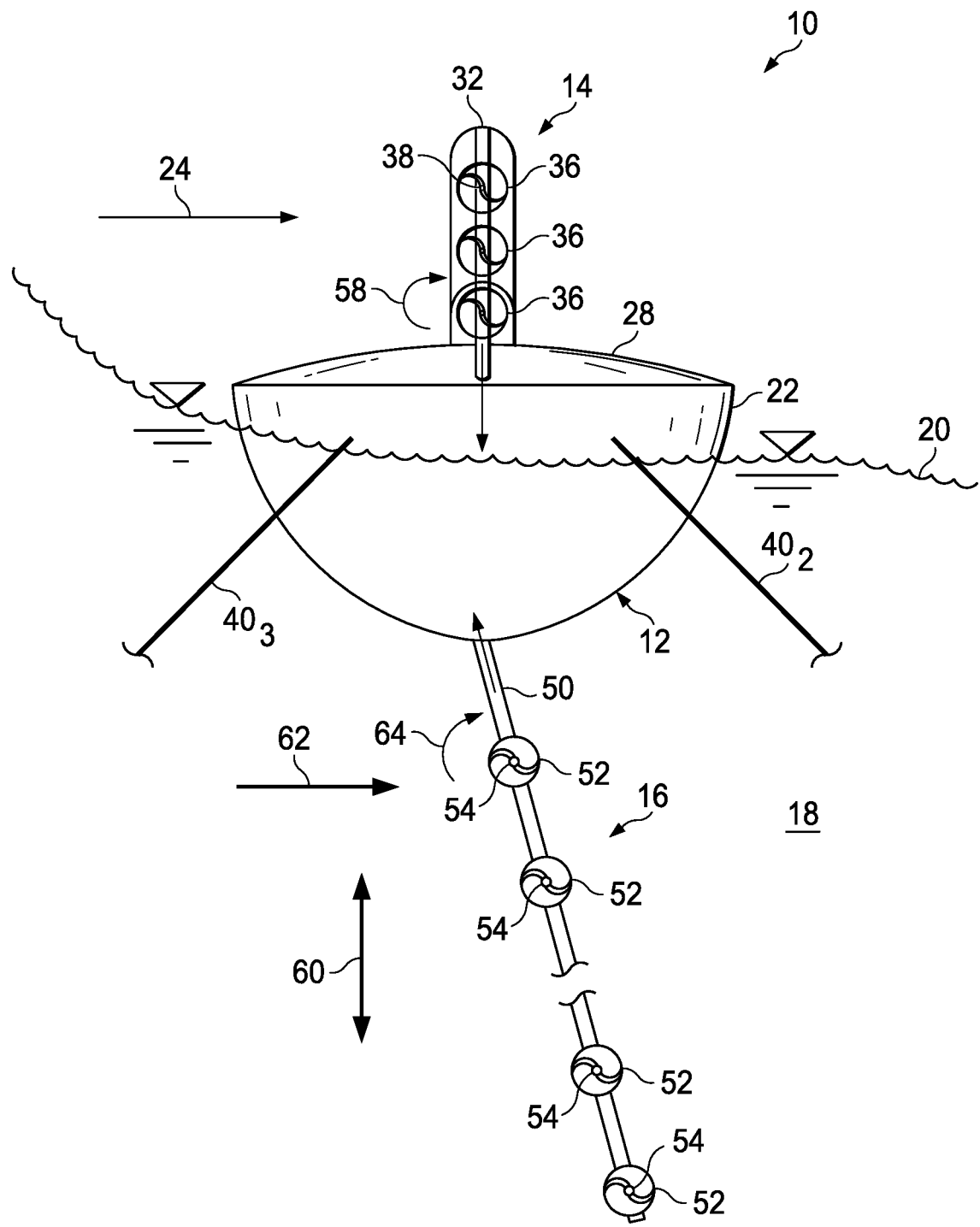
FIG. 2 is a diagram illustrating a side view of the embodiment of the power generation system of FIG. 1 according to the present disclosure.
Figure 3:
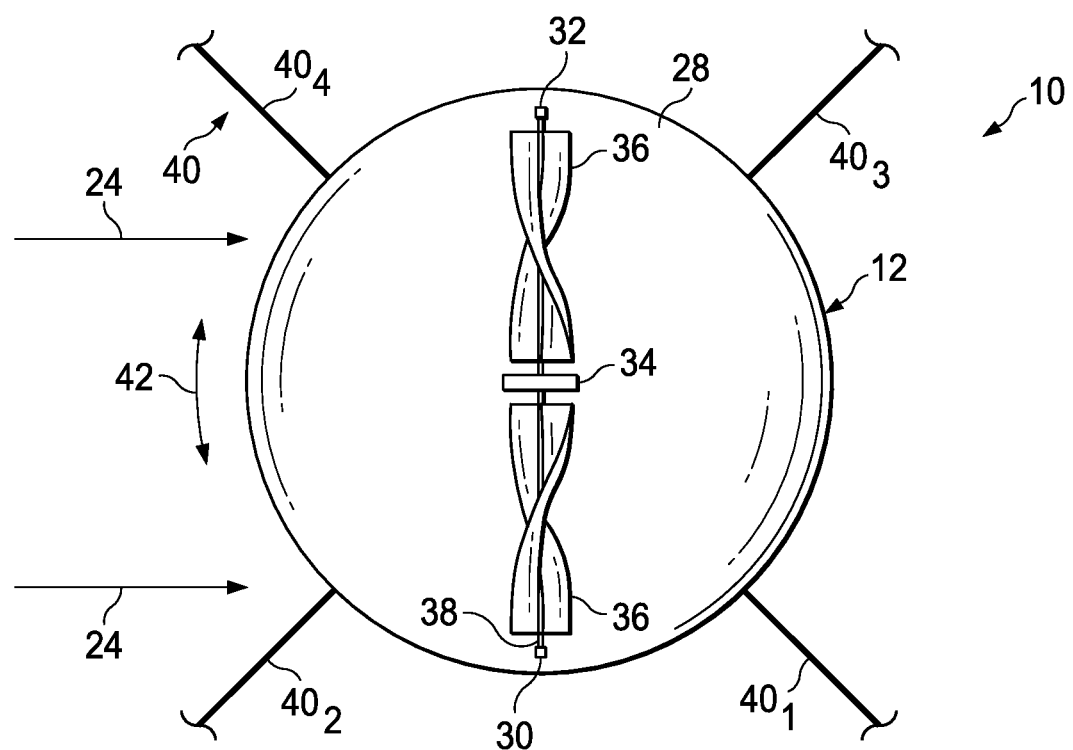
FIG. 3 is a diagram illustrating a top view of the embodiment of the power generation system of FIGS. 1 and 2 according to the present disclosure.

With reference now to the Figures and in particular with reference to FIGS. 1-3, exemplary diagrams of a power generation system 10 according to the present disclosure are provided. FIG. 1 is a diagram illustrating a front view of an embodiment of system 10 according to the present disclosure, FIG. 2 is a diagram illustrating side view of system 10 illustrated in FIG. 1 according to the present disclosure, and FIG. 3 is a diagram illustrating a top view of system 10 illustrated in FIGS. 1 and 2 according to the present disclosure. In FIGS. 1-3, system 10 includes a flotation assembly 12 and harnessing assemblies 14 and 16. Flotation assembly 12 is configured to stay afloat in a body of water 18 such that flotation assembly 12 rests essentially at a water line or surface 20 of the body of water 18. The body of water 18 may be a sea/ocean, lake, river, or any other type of water mass. Flotation assembly 12 may include one or more buoyant structures 22 that enables harnessing assembly 14 to extend upwardly above the surface 20 of the water 18 and/or be otherwise disposed at least partially in an airflow 24 above the surface 20 the water 18 while harnessing assembly 16 is disposed at least partially in and/or otherwise extends downwardly into the water 18. Thus, it should be understood that while the illustrated embodiment depicts a portion of flotation assembly residing above the surface 20 of the water 18 and a portion residing below the surface 20 of the water 18, flotation assembly may be configured to reside entirely above or entirely below the surface 20 of the water 18 so long as harnessing assembly 14 extends upward into the airflow 24 above the surface 20 of the water 18 and harnessing assembly 16 extends downwardly into the water 18.

In the illustrated embodiment, harnessing assembly 14 includes a support base 28 having coupled thereto support members 30, 32, and 34 and extending upwardly away from the surface 20 of the water 18 and into the airflow 24 above the surface 20 of the water 18. In this embodiment, harnessing assembly 14 also includes paddles 36 rotationally coupled to support members 30, 32, and 34 and positioned relative to support members 30, 32, and 34 to be disposed within the airflow 24. Paddles 36 are configured to harness the airflow 24 and create and/or otherwise generate rotational kinetic energy from the airflow 24. In the illustrated embodiment, paddles 36 are configured as helical paddles 36 (having a helical twist or helix configuration having helical blades or foils) such that paddles 36 unidirectionally rotate relative to support members 30, 32, and 34 regardless of a direction of the airflow 24 (e.g., able to accept an airflow from any direction). However, it should be understood that paddles 36 may be otherwise configured. In the illustrated embodiment, harnessing assembly is depicted having three support members 30, 32, and 34 rotationally supporting six axially supported paddles 36; however, it should be understood that the quantity and/or arrangement of support members 30, 32, and 34 and/or paddles 36 may vary (e.g., being greater or lesser in quantity). Thus, it should be understood that the lengths (or heights) of support members 30, 32, and 34 may be increased or decreased to accommodate different quantities of paddles 36. Further, it should be understood that additional support members and/or paddles 36 may be extended in a lateral direction.

Figure 4:
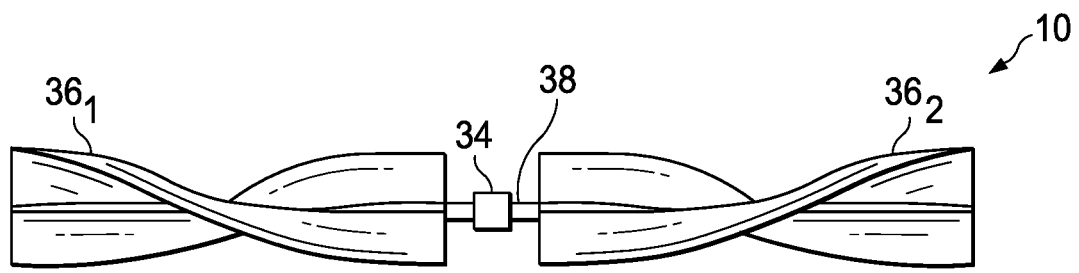
FIG. 4 is a diagram illustrating an embodiment of a rotating blade pair of the power generation system illustrated in FIGS. 1-3 according to the present disclosure.

In the illustrated embodiment, harnessing assembly 14 is configured having sets and/or pairs of paddles 36 where each set or pair of paddles 36 is spaced vertically apart from each other and located at different elevational levels relative to support members 30, 32, and 34. However, it should be understood that the quantity of paddles 36 may vary, and that paddles 36 may be disposed in non-pair configurations. In the illustrated embodiment, each set or pair of paddles 36 at a particular elevation is mounted on a respective axle 38 to transfer and/or otherwise transmit rotational energy harnessed via the airflow 24 by the respective set of paddles 36 to mechanism(s) of and/or within support member 34. For example, in some embodiments, support member 34 comprises a conduit housing shaft(s), gears, pulley(ies), linkage(s), etc., to mechanically transfer the rotational energy harnessed by paddles 36 to a generating module supported by and/or in flotation assembly 12 where the generating module generates electricity from the rotational energy harnessed by paddles 36. Further, in the illustrated embodiment, for each pair of paddles 36 at a particular elevation, the paddles 36 are mounted to axle 38 at a one hundred eighty degree (180°) rotational angle relative to each other (e.g., 180° out of phase relative to each other) to balance forces applied to the paddles 36 by the airflow 24 (e.g., the resulting in the forces applied to paddles 36 being congruent with a central axis of flotation assembly 12, thereby having a reduced tendency to create overturning or undue twisting effects). For example, FIG. 4 depicts an enlarged view of a pair of paddles 36 (e.g., paddles $36_1$ and $36_2$) mounted to axle 38 and support member 34 at a particular elevation. In FIG. 4, paddles $36_1$ and $36_2$ are mounted to axle 38 such that paddles $36_1$ and $36_2$ both rotate in the same direction resulting from the airflow 24 with symmetrical forces applied to and on supports 30, 32, and 34. For example, referring to FIG. 4, in the illustrated embodiment, paddles $36_1$ and $36_2$ are configured and mounted to axle 38 such that the airflow 24 would cause rotation of paddles $36_1$ and $36_2$ in the direction 58 (e.g., clockwise based on the view perspective of FIG. 2) relative to support members 30, 32, and 34; however, it should be understood that the rotational direction of the paddles 36 could be otherwise configured. Referring to FIG. 4, paddle $36_2$ is mounted to axle 38 angle out of rotational phase by 180° relative to paddle $36_1$. However, it should be understood that the arrangement of paddles 36 may be otherwise configured.

As illustrated in FIGS. 1-3, system 10 includes anchors 40 (e.g., anchors $40_1$, $40_2$, $40_3$, and $40_4$) to restrain movement of flotation assembly 12 and/or otherwise secure flotation assembly 12 to a structure (e.g., the seabed or ocean floor, a submerged weight or concrete structure, a non-submerged structure, etc.). It should be understood that the quantity of anchors 40 and/or the configuration/arrangement thereof may vary for retraining flotation assembly 12. Anchors 40 may comprise a mooring line, cable, chain, or other type of element to maintain a general position of flotation assembly 12 within the body of water 18. It should be understood that while anchors 40 maintain a general position of flotation assembly 12 within the body of water 18, anchors 40 enable movement of flotation assembly 12 within the body of water 18 to accommodate movement of the water 18 resulting from wave and tidal movements of the water 18. For example, anchors 40 are configured having slack to enable flotation assembly 12 to move upward/downward resulting from the rise and fall of wave and tidal movements of the water 18, which therefore may also result in some translational movement of flotation assembly 12 within the water 18.

In the illustrated embodiment, support base 28 is rotatably coupled to a lower section or bottom 46 of flotation assembly 12 to enable support base 28 to rotate relative to flotation assembly 12 in the directions 42 indicated in FIG. 3. Thus, harnessing assembly 14 is configured to rotate relative to flotation assembly 12 to account for non-congruency of wind/airflow 24 movement/direction verses water 18 movement/direction. However, it should be understood that system 10 may be otherwise configured to provide rotational movement to accommodate the non-congruency of air and water 18 movements. Thus, by enabling rotation of harnessing assembly 14 relative to flotation assembly 12, harnessing assembly 14 responds to the particular direction of the airflow 24 and causes rotation of support base 28 relative to bottom 46 of flotation assembly 12 to correspond to the direction of the airflow 24. Further, in exemplary embodiments, anchors 40 may be configured to enable rotational movement of flotation assembly 12 within the water 18 in the directions 42 indicated in FIG. 3. For example, by enabling rotation of flotation assembly 12 within the water 18, harnessing assembly 14 may further respond to the particular direction of the airflow 24 based on rotation of flotation assembly 14 within the water 18 to enable harnessing assembly 14 to correspond to the direction of the airflow 24. Thus, in operation, the forces applied by the airflow 24 to the paddles 36 cause rotation of harnessing assembly 14 and/or flotation assembly 12 corresponding to the direction of the airflow, thereby efficiently aligning the harnessing assembly 14 (e.g., paddles 36) perpendicular to the direction of the airflow 24 and maximizing the energy harnessing action of the paddles 36 to the airflow 24.

In the embodiment illustrated in FIGS. 1-3, harnessing assembly 16 is coupled to a lower section or bottom 46 of flotation assembly 12 and is coupled to flotation assembly 12 to enable rotational and/or pivotal movement of harnessing assembly 16 relative to flotation assembly 12. For example, in the illustrated embodiment, harnessing assembly 16 includes a support member 50 extending downwardly into and/or within the body of water 18. In this embodiment, harnessing assembly 16 also includes paddles 52 rotationally coupled to support member 50 and positioned relative to support member 50 to be disposed within the water 18 to harness movement of the water 18 (e.g., wave, tidal, and/or current movement). Paddles 52 are configured to harness the movement of the water 18 and create and/or otherwise generate rotational kinetic energy from the movement of the water 18. In the illustrated embodiment, paddles 52 are also configured as helical paddles 52 (having a helical twist or helix configuration having helical blades or foils) such that paddles 52 unidirectionally rotate relative to support member 50 regardless of a direction of the movement of the water 18 relative thereto (e.g., able to accept movement or a flow of the water 18 from any direction). However, it should be understood that paddles 52 may be otherwise configured. Further, in the illustrated embodiment, support member 50 is coupled to bottom 46 of flotation assembly 12. However, it should be understood that support member 50 may be otherwise coupled to flotation assembly 12 (e.g., coupled to an intermediate location, coupled to intervening structure, etc.).

As best illustrated in FIGS. 1 and 2, harnessing assembly 14 is configured having sets and/or pairs of paddles 52 spaced vertically apart from each other and located at different elevational levels within the water 18. However, it should be understood that the arrangement of paddles 52 may be otherwise configured (e.g., in non-pair configurations). In the illustrated embodiment, each pair of paddles 52 is mounted on a respective axle 54 to transfer and/or otherwise transmit rotational energy harnessed via the water 18 movement by the respective paddles 52 to mechanism(s) of and/or within support member 50. For example, in some embodiments, support member 50 comprises a conduit housing shaft(s), gears, pulley(ies), linkage(s), etc., to mechanically transfer the rotational energy harnessed by paddles 52 to the generating module supported by and/or in flotation assembly 12 where the generating module generates electricity from the rotational energy harnessed by paddles 52. In the embodiment illustrated in FIGS. 1 and 2, the elevational spacing between sets of pairs of paddles 52 is greater within water 18 that for sets of pairs of paddles 36 disposed in the airflow 24 to accommodate the possibility of obstructions in a flowing medium (e.g., greater likelihood of obstructions within water 18 that in the airflow 24). Thus, due to the greater likelihood of debris or other type of obstructive material within water 18 than airflow 24, the elevational spacing between sets of paddles 36 within airflow 24 may be less than the elevational spacing between sets of paddles 52 within water 18 to prevent the possible interference of such debris with paddles 36 and 52.

Similar to the configuration of paddle 36 mounting described in connection with FIG. 4, pairs of paddles 52 mounted at a particular elevation to support member 50 are mounted to axle 54 at a one hundred eighty degree (180°) rotational angle relative to each other (e.g., 180° out of phase relative to each other) to balance forces applied to the paddles 52 by movement of the water 18. As described above, mounting paddles 52 in this manner balance forces applied to the paddles 52 by the water 18 (e.g., the resulting in the forces applied to paddles 52 being congruent with a central axis of flotation assembly 12, thereby having a reduced tendency to create overturning or undue twisting effects).

Figure 5:
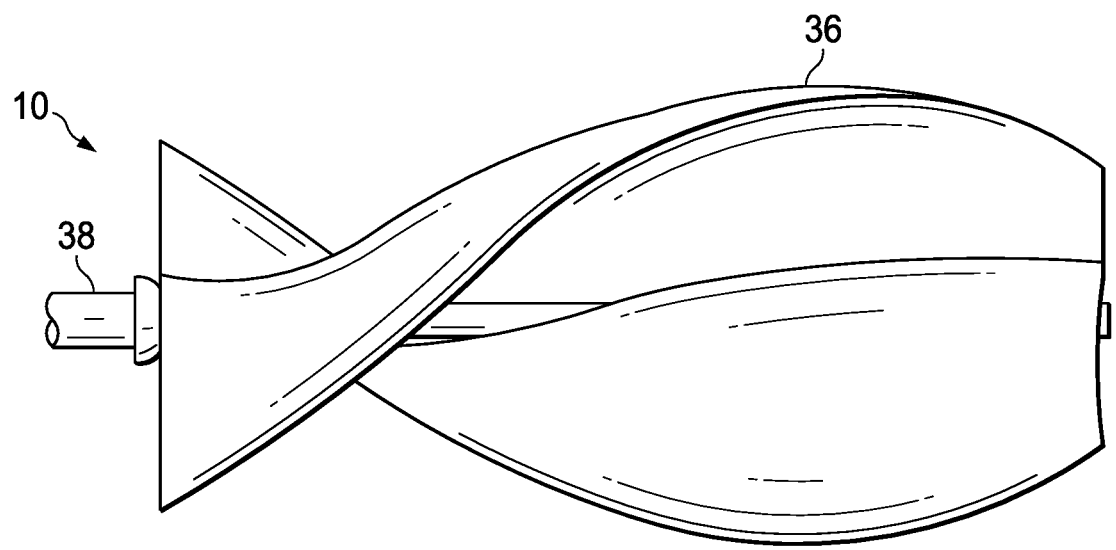
FIG. 5 is a diagram illustrating an enlarged view of a rotatable paddle of the power generation system illustrated in FIGS. 1-4 according to the present disclosure.

FIG. 5 is a diagram illustrating an enlarged view of paddle 36 of system 10 according to the present disclosure. It should be understood that paddle 52 may be similarly configured. As depicted in FIG. 5, paddle 36 is configured as a helical paddle 36 having a helix or spiral twist. In this embodiment, paddle 36 is configured having a double helix blade. However, it should be understood that other types of helical or non-helical paddles may be used.

As described above, support member 50 is coupled to flotation assembly 12 to enable rotational and/or pivotal movement of harnessing assembly 14 within the water 18 such that harnessing assembly 14 self-orients corresponding to a direction of a flow of the water 18. For example, by rotationally and/or pivotally coupling support member 50 to flotation assembly 12, forces applied by the movement of the water 18 against paddles 52 mounted on opposite sides of support member 50 cause support member 50 to rotate, thereby resulting in harnessing assembly 16 self-orienting to the movement direction of the flow of water 18 and efficiently aligning the harnessing assembly 14 perpendicular to the direction of the flow of the water 18 and maximizing the energy harnessing action of the paddles 52 to the flow of the water 18. Additionally, water 18 currents (e.g., in the ocean) and airflow 24 currents over the ocean generally travel in the same general direction. The above water 18 surface 20 of system 10 will be able to swivel/rotate for the difference in the airflow 24 verses the water 18 flow. The paddles 52 in the water 18 rotate and/or pivot on the under the surface 20 of the water 18 to resist overturning of the flotation assembly 12.

In operation, referring to FIGS. 1-3, airflow 24 is harnessed by paddles 36 to generate rotational kinetic energy of axles 38, and the rotational energy of axles 38 is transmitted and/or otherwise transferred by support member 34 to a generating module supported by and/or in flotation assembly 12 where the generating module generates electricity from the rotational energy harnessed by paddles 36. Within water 18, various types of movement of the water 18 is harnessed by harnessing assembly 16 as rotational kinetic energy and also transferred to the generating module to generate electricity from the rotational energy harnessed by paddles 52. For example, referring to FIGS. 1 and 2, movement of the water 18 in the directions indicated by reference 60 caused by tidal and/or wave action of the water 18 cause flotation assembly 12 to move upward/downward elevationally in the same directions 60 within water 18 (e.g., flotation assembly 12 remaining essentially at the surface 20 of the water 18 as the surface 20 of the water 18 moves upward/downward due to the wave/tidal action of the water 18), thereby causing rotation of paddles 52 as harnessing assembly 16 moves upward/downward within the water 18 (e.g., in the direction 64 (e.g., clockwise based on the view perspective of FIG. 2)

relative to support member 50; however, it should be understood that the rotational direction of the paddles 52 could be otherwise configured). Additionally, movement of the water in the direction 62 resulting from a current flow of the water 18 also causes rotation of paddles 52 in the direction 64. Harnessing assembly 16 harnesses the current flow of the water 18 to generate rotation of axle 54 via paddles 52, and then transmits and/or otherwise relays that rotation movement via support member 50 to the generating module supported by and/or in flotation assembly 12 where the generating module generates electricity from the rotational energy harnessed by paddles 52.

Figure 6:
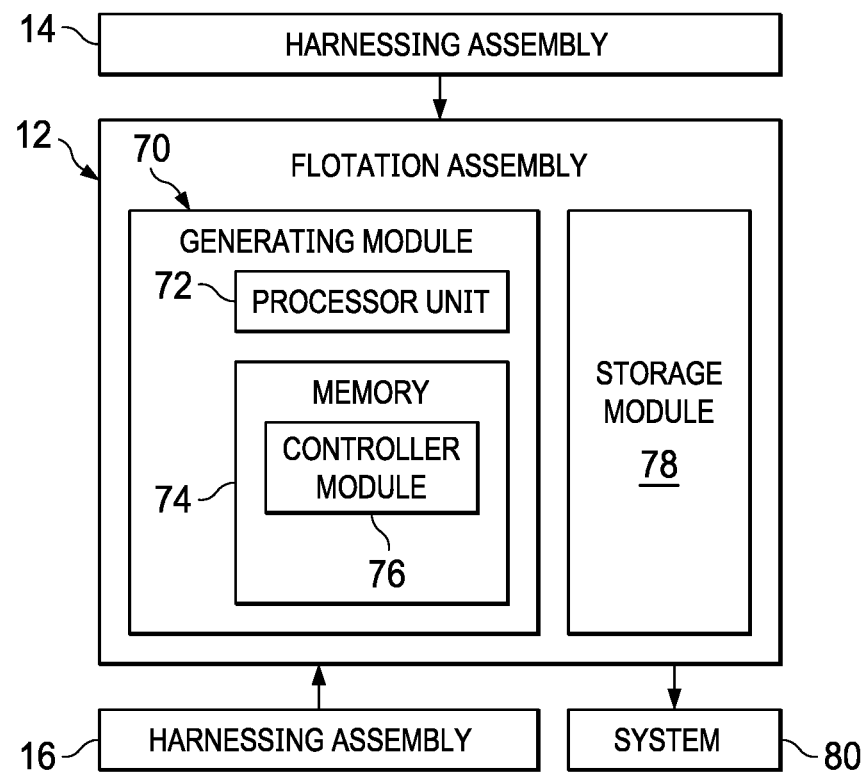
FIG. 6 is a block diagram illustrating an embodiment of a power generation system according to the present disclosure.

FIG. 6 is a block diagram illustrating an embodiment of system 10 according to the present disclosure. In the embodiment illustrated in FIG. 6, system 10 includes flotation assembly 12 and harnessing assemblies 14 and 16. In the illustrated embodiment, flotation assembly 12 includes a generating module 70 for generating, storing, and/or otherwise transmitting or transferring electricity, electrical energy, and/or power based on energy harnessed by harnessing assemblies 14 and 16. In FIG. 6, generating module 70 includes a processor unit 72, a memory 72 having a controller module 76, and a storage module 78. Generating module 70 may include various components for generating electricity from rotational kinetic energy received from harnessing assemblies 14 and/or 16 (e.g., a generator receiving rotational input from harnessing assemblies 14 and/or 16). Storage module 78 may include batteries and/or other mechanisms for storing electrical energy generated by generating module 70. Controller module 76 may perform one or more operations and/or functions for controlling the storage and/or transmission of electricity, electrical energy and/or electric power generated by system 10 to an external system 80. For example, controller module 76 may store electricity and output that electricity to system 80 when an amount of electricity storage reaches some threshold or according to demand signals received from system 80. Controller module 76 may control the transfer of electricity and/or power using wired or wireless methods (e.g., wireless power transfer (WPT), wireless power transmission, wireless energy transmission (WET), or electromagnetic power transfer for transmitting electrical energy without wires as a physical link). Controller module 76 and/or storage module 78 may be implemented in any suitable manner using known techniques that may be hardware-based, software-based, or some combination of both. For example, controller module 76 and/or storage module 78 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

The present invention may include computer program instructions at any possible technical detail level of integration (e.g., stored in a computer readable storage medium (or media) (e.g., memory 74) for causing a processor (e.g., processor unit 72) to carry out aspects of the present invention. Computer readable program instructions described herein can be downloaded to respective computing/processing devices (e.g., generating module 70 and/or storage module 78). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Accordingly, aspects of the present disclosure may take the form of a hardware embodiment, a software embodiment (including firmware, resident software, microcode, etc.) or an embodiment combining software and hardware aspects that may all generally be referred to herein as a "circuit," "module" or "system."

Thus, embodiments of system 10 of the present disclosure create energy from wind movement over a water surface, from the oscillating, rise and fall, action of ocean waves, and from the steady movement of ocean water current below the ocean surface, which occur primarily coincidental and in the same general direction. Embodiments of the present invention provides for a continuous supply of energy through work created from the wind, the wave and the water action and offsets the use of oil, coal, and gas with a safe, reliable, renewable solution source. System 10 takes advantage of the constant wind and water currents over and under the water surface, notably the ocean (e.g., a floating city), as well as the wave action of the ocean and other large bodies of water, to provide for a constant source of mechanical input conversion to power. Generally, the winds, whether generated by a coastal storm or an afternoon summer sea breeze, blow faster over the ocean than over the land because there is not as much friction over the water. The land has mountains, coastal barriers, trees, human-made structures, and sediments that cause a resistance to the wind flow. Therefore, system 10 will not need to project wind turbines high over the water to benefit from the wind speeds existing closer to the surface of a body of water. However, there is more energy to be gained from water movement even at a slower rate and less area because of its density of the ocean water relative to that of air. System 10 uses wind, wave, water, and even the earth, moon and sun for input energy. Winds and currents move the surface water causing waves. The gravitational attraction of the moon causes the oceans to bulge out in the direction of the moon. Another bulge occurs on the opposite side since the earth is also being pulled toward the moon (and away from the water on the far side). The use of wind, wave, and water as sources of energy by system 10 provides a highly dependable source of energy.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A power generation system, comprising:
   a flotation assembly configured to float in water;
   a first harnessing assembly coupled to a support base positioned above the water, said first harnessing assembly disposed in an airflow above the water, the first harnessing assembly configured to harness the airflow to create a first rotational energy; and
   a second harnessing assembly coupled to the flotation assembly and disposed in the water, the second rotational assembly configured to harness movement of the water to create a second rotational energy; and
   wherein the flotation assembly includes a generating module to convert the first and second rotational energies into electrical energy,
   wherein said second harnessing assembly includes an elongate support member shaft extending downward from said flotation assembly, said elongate support member shaft having an upper end that is pivotally coupled to a lower section or bottom side of said flotation assembly,
   wherein said elongate support member shaft is configured for pivotal movement relative to said flotation assembly such that an angle formed between an axis defined by said elongate support member shaft, and a plane defined by a surface of said water, may vary with said pivotal movement,
   wherein the first and second harnessing assemblies each include at least one first helical paddle and at least one second helical paddle having a common axis of rotation,
   wherein said at least one first helical paddle and said at least one second helical paddle are configured to unidirectionally rotate, and are one hundred and eighty degrees out of phase relative to each other,
   wherein said support base forms an upper section of said flotation assembly and is rotationally coupled to said lower section or bottom side of said flotation assembly.

2. The system of claim 1, further comprising an anchor configured to couple the flotation assembly to a structure.

3. The system of claim 1, wherein the second harnessing assembly is configured to create the second rotational energy from wave movement within the water and current movement within the water.

4. The system of claim 1, wherein the second harnessing assembly is also rotationally coupled to the flotation assembly.

5. A power generation system, comprising:
   a flotation assembly configured to float in water;
   a first harnessing assembly coupled to a support base forming an upper section of said flotation assembly and is positioned above the water, said first harnessing assembly extending from the support base into an airflow above the water, the first harnessing assembly harnessing the airflow to generate a first kinetic energy, said support base rotationally coupled to a lower section or bottom of said flotation assembly; and
   a second harnessing assembly having an elongate support member shaft extending downward from the flotation assembly into the water, the second harnessing assembly harnessing movement of the water to generate a second kinetic energy, the second harnessing assembly coupled to the flotation assembly to self-orient corresponding to a direction of the movement of the water; and
   wherein the flotation assembly includes a generating module to convert the first and second kinetic energies into electrical energy,
   wherein said second harnessing assembly includes a first helical paddle and a second helical paddle attached to said elongate support member shaft,
   wherein said first helical paddle and said second helical paddle have a common axis of rotation,
   wherein said first helical paddle and said second helical paddle are one hundred eighty degrees out of phase relative to each other,
   wherein said elongate support member shaft has an upper end that is pivotally coupled to said lower section or bottom side of said flotation assembly, wherein said elongate support member shaft is configured for pivotal movement relative to said flotation assembly such that an angle formed between an axis defined by said elongate support member shaft, and a plane defined by a surface of said water, may vary with said pivotal movement.

6. The system of claim 5, wherein the second harnessing assembly is configured to generate the second kinetic energy from wave movement of the water and current movement of the water.

7. The system of claim 5, further comprising an anchor configured to couple the flotation assembly to a structure.

8. The system of claim 5, further comprising a controller configured to transmit the electrical energy.

9. The system of claim 5, wherein the second harnessing assembly is also rotationally coupled to the flotation assembly.

10. A power generation system, comprising:
    a flotation assembly configured to float in water;
    a first harnessing assembly coupled to a support base forming an upper section of said flotation assembly that is positioned above the water and is rotationally coupled to a lower section or bottom of said flotation assembly, said first harnessing assembly extending from said support base into an airflow above the water, the first harnessing assembly having a first helical paddle to harness the airflow to generate a first rotational energy; and a second harnessing assembly having an elongate support member shaft extending downward from the flotation assembly into the water, the second harnessing having a second helical paddle and third helical paddle having a common axis of rotation to harness movement of the water to generate a second rotational energy; and wherein the flotation assembly includes a generating module to convert the first and second rotational energies into electrical energy, wherein said elongate support member shaft has an upper end that is pivotally coupled to said lower section or bottom side of said flotation assembly, wherein said elongate support member shaft is configured for pivotal movement relative to said flotation assembly such that an angle formed between an axis defined by said elongate support member shaft, and a plane defined by a surface of said water, may vary with said pivotal movement, wherein said second helical paddle and said third helical paddle are configured to unidirectionally rotate, and are one hundred and eighty degrees out of phase relative to each other.

11. The system of claim 10, wherein the second harnessing assembly is also rotationally coupled to the flotation assembly.

12. The system of claim 10, wherein the second harnessing assembly is configured to generate the second rotational energy from wave movement of the water and current movement of the water.

13. The system of claim 10, further comprising an anchor configured to couple the flotation assembly to a structure.

14. The system of claim 10, further comprising a controller configured to transmit the electrical energy.

15. The system of claim 10, wherein the first harnessing assembly is configured to orient the first helical paddle corresponding to a direction of the airflow.

\* \* \* \* \*